US012729813B2

(12) United States Patent
Yamamoto et al.

(10) Patent No.: US 12,729,813 B2
(45) Date of Patent: Sep. 8, 2026

(54) VAPORIZER

(71) Applicants: Ryosuke Yamamoto, Seto (JP); Toshihisa Tanaka, Toyota (JP); Taichi Oda, Toyota (JP)

(72) Inventors: Ryosuke Yamamoto, Seto (JP); Toshihisa Tanaka, Toyota (JP); Taichi Oda, Toyota (JP)

(73) Assignees: TOYOTA JIDOSHA KABUSHIKI KAISHA, Aichi-Ken (JP); SUZUKI SHOKAN CO., LTD., Tokyo (JP)

( * ) Notice: Subject to any disclaimer, the term of this patent is extended or adjusted under 35 U.S.C. 154(b) by 284 days.

(21) Appl. No.: 18/518,582

(22) Filed: Nov. 23, 2023

(65) Prior Publication Data

US 2024/0175548 A1 May 30, 2024

(30) Foreign Application Priority Data

Nov. 24, 2022 (JP) ................................ 2022-187620

(51) Int. Cl.
*F17C 9/02* (2006.01)

(52) U.S. Cl.
CPC .......... *F17C 9/02* (2013.01); *F17C 2221/012* (2013.01); *F17C 2227/0316* (2013.01)

(58) Field of Classification Search
CPC .................. F17C 9/02; F17C 2221/012; F17C 2227/0316; F17C 2227/0309; F17C 2227/0323; F28D 7/04; F28D 7/022; F28D 7/024
See application file for complete search history.

(56) References Cited

U.S. PATENT DOCUMENTS

| | | | | | |
|---|---|---|---|---|---|
| 3,526,273 | A * | 9/1970 | Wentworth, Jr. | F28D 7/024 | 165/DIG. 407 |
| 5,572,885 | A * | 11/1996 | Erickson | F28F 1/08 | 62/484 |
| 6,047,767 | A * | 4/2000 | Bodhaine | F28D 7/024 | 165/163 |
| 7,261,149 | B2 * | 8/2007 | Nail | F28F 9/00 | 165/163 |
| 9,683,785 | B2 * | 6/2017 | Tandon | F28D 7/106 | |
| 2008/0149317 | A1 * | 6/2008 | Baker | F28D 7/022 | 165/163 |
| 2015/0136368 | A1 * | 5/2015 | Tandon | F28F 21/06 | 165/163 |
| 2024/0175548 | A1 * | 5/2024 | Yamamoto | F17C 9/02 | |

FOREIGN PATENT DOCUMENTS

| | | | | |
|---|---|---|---|---|
| CN | 108150822 A * | 6/2018 | F17C 13/00 |
| CN | 114705063 A | 7/2022 | |
| JP | S59-048479 U | 3/1984 | |
| JP | 2886204 B2 | 4/1999 | |
| JP | 2021-021433 A | 2/2021 | |
| TW | 201730475 A * | 9/2017 | F28D 7/022 |

* cited by examiner

*Primary Examiner* — Gregory A Wilson
(74) *Attorney, Agent, or Firm* — HAUPTMAN HAM, LLP

(57) ABSTRACT

A vaporizer, through which a liquid heat medium and liquid hydrogen flow, causing the heat medium to vaporize the liquid hydrogen, includes: a spiral tube, spirally wound, in which liquid hydrogen flows; a casing being a hollow long member housing the spiral tube thereinside, the heat medium flowing on an outer surface of the spiral tube; and a spacer being a long member disposed inside a winding inner diameter of the spiral tube.

2 Claims, 2 Drawing Sheets

A-A SECTION

VAPORIZER

CROSS REFERENCE TO RELATED APPLICATION

This application claims priority to Japanese Patent Application No. 2022-187620 filed on Nov. 24, 2022, which is incorporated herein by reference in its entirety including the specification, claims, drawings, and abstract.

TECHNICAL FIELD

The present disclosure relates to a structure of a vaporizer that vaporizes liquid hydrogen.

BACKGROUND

There has been proposed a vaporizer that vaporizes liquid hydrogen and supplies it to an internal combustion engine. For example, JP 2021-021433 A discloses a vaporizer that exchanges heat between heated helium gas and liquid hydrogen to vaporize the liquid hydrogen.

In addition, in JP 2886204 B, has proposed a system that includes a hydrogen engine and an expansion engine so that: the exhaust gas from the hydrogen engine heats a heat medium to drive the expansion engine; and the high-temperature exhaust gas from the expansion engine heats liquid hydrogen to form hydrogen gas that is supplied to the hydrogen engine.

SUMMARY

Liquid hydrogen has an extremely low temperature. This may freeze the moisture in the heat medium for heat exchange in the system as described in JP 2886204 B, clogging the channel or decreasing the heat exchange efficiency. In contrast, in the case where helium gas is used as an intermediate heat medium as in the system described in JP 2021-021433 A, the heat medium does not freeze. However, the heat exchange with the gas disadvantageously decreases the heat exchange efficiency, resulting in a large size of the vaporizer.

Therefore, it is an advantage of the present disclosure to provide a compact vaporizer for liquid hydrogen.

The vaporizer of the present disclosure, through which a liquid heat medium and liquid hydrogen flow, causing the heat medium to vaporize the liquid hydrogen, includes: a spiral tube, spirally wound, in which the liquid hydrogen flows; a casing being a hollow long member housing the spiral tube thereinside, the heat medium flowing on an outer surface of the spiral tube; and a spacer being a long member disposed inside a winding inner diameter of the spiral tube.

This configuration makes it possible to reduce the area of the channel, through which the liquid heat medium flows, and increase the flow velocity of the liquid heat medium in the casing, preventing the heat medium from freezing.

The vaporizer of the present disclosure may be configured so that the spacer is a hollow closed cross-section member extending in a longitudinal direction of the casing, the spacer forming an annular channel between the spacer and an inner surface of the casing, the annular channel extending in the longitudinal direction of the casing, the annular channel being a channel through which the heat medium flows in the longitudinal direction.

This configuration makes it possible to further reduce the area of the channel, through which the liquid heat medium flows, and further increase the flow velocity of the liquid heat medium in the casing, further preventing the heat medium from freezing. This makes it possible to reduce the weight of the spacer, resulting in a compact vaporizer.

The vaporizer of the present disclosure may be configured so that the spiral tube is disposed in the annular channel so as to have a gap between the spiral tube and the inner surface of the casing, and a gap between the spiral tube and an outer surface of the spacer.

This configuration causes the heat medium to flow into the gap, improving the heat exchange efficiency and causing the vaporizer to be compact. Moreover, the spiral tube reduces the channel area of the annular channel, enabling increase of the flow velocity of the heat medium inside the annular channel and preventing freezing of the heat medium. Furthermore, the gap prevents the casing or spacer from being in contact with the extremely-low-temperature spiral tube. Thereby, the temperature change of the casing or spacer can be prevented.

The vaporizer of the present disclosure may be configured so that the casing includes a large cylindrical portion and large end plates attached to respective ends of the large cylindrical portion, and further includes a rod-shaped outer tube receiver attached to an inner surface of the large cylindrical portion, the rod-shaped outer tube receiver extending in the longitudinal direction, the spacer includes a small cylindrical portion and small end plates attached to respective ends of the small cylindrical portion, and further includes an inner tube receiver attached to an outer surface of the small cylindrical portion, the inner tube receiver extending in the longitudinal direction, the inner surface of the large cylindrical portion and the outer surface of the small cylindrical portion form the annular channel, and the spiral tube is mounted in the annular channel so as to cause the outer tube receiver to form a gap between a spiral tube surface on a winding outer diameter side and the inner surface of the large cylindrical portion and so as to cause the inner tube receiver to form a gap between a spiral tube surface on a winding inner diameter side and the outer surface of the small cylindrical portion.

This configuration reduces the area of the casing and the spacer in contact with the extremely-low-temperature spiral tube, thereby preventing temperature change of the casing or spacer.

The vaporizer of the present disclosure may be configured so that the heat medium is LLC or water.

Use of a general refrigerant such as LLC or water can simplify the system configuration.

The present disclosure can provide a compact vaporizer for liquid hydrogen.

BRIEF DESCRIPTION OF DRAWINGS

Embodiment(s) of the present disclosure will be described based on the following figures, wherein.

DESCRIPTION OF EMBODIMENTS

Figure 1:
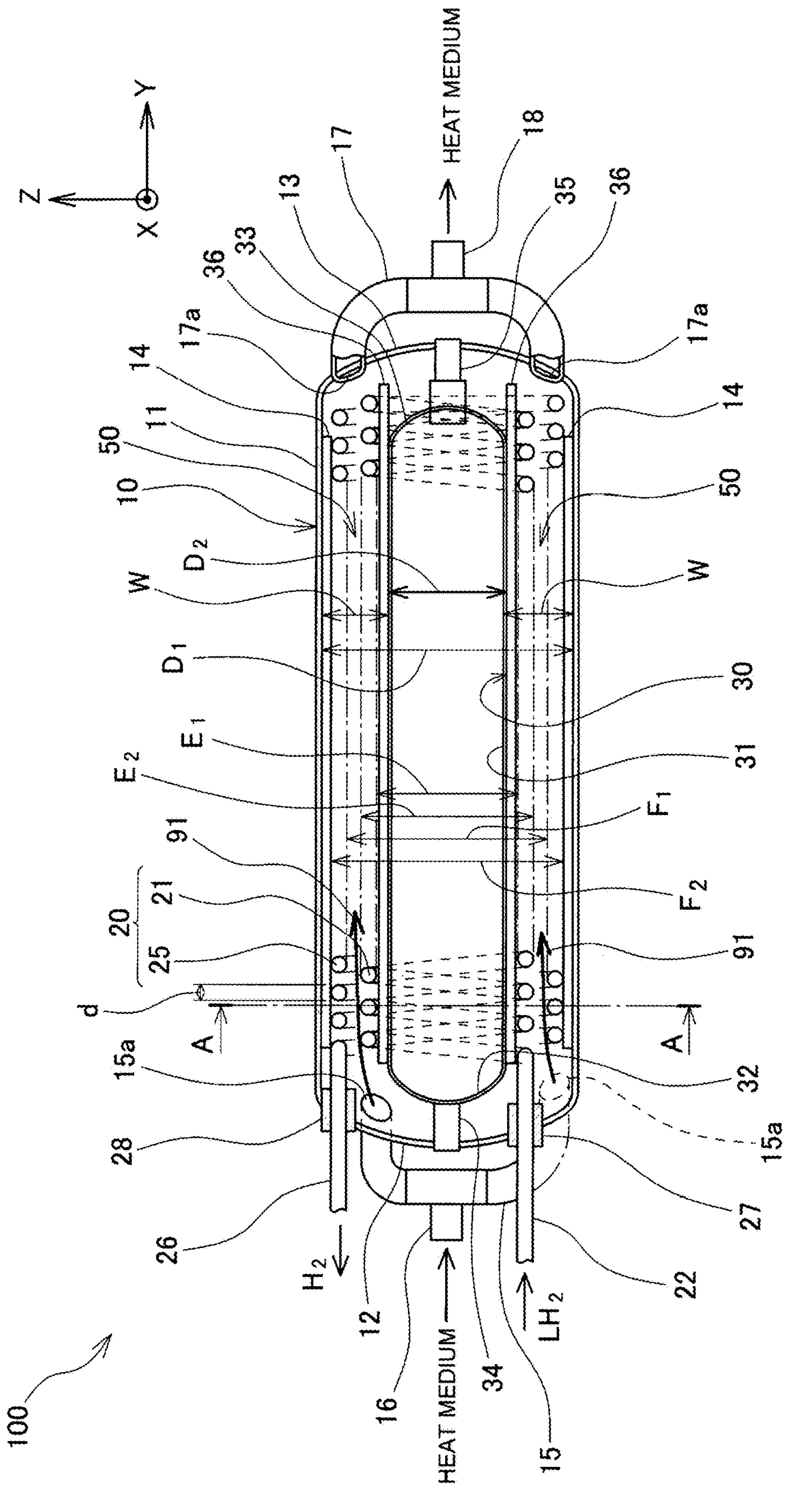
FIG. 1 is a sectional view of a vaporizer of an embodiment.

A vaporizer 100 of an embodiment will be described below with reference to the drawings. As shown in FIG. 1, the vaporizer 100 includes a casing 10, a spiral tube 20, and a spacer 30. In the following description, the longitudinal direction of the casing 10 is a Y-direction, the direction orthogonal to the Y-direction is an X-direction, and the direction orthogonal to the X- and Y-directions is a Z-direction. In addition, in the description the direction in which the heat medium flows inside the casing 10 is the Y-direction plus side, and the opposite direction is the Y-direction minus side. $LH_2$ and $H_2$ in the figure indicate liquid hydrogen and hydrogen gas, respectively.

The casing 10 is a hollow long member that includes a central large cylindrical portion 11 and large end plates 12 and 13 at respective ends. The casing 10 has a heat medium flowing therein. The large cylindrical portion 11 is a cylindrical long member having an inner diameter D1 and extending in the longitudinal direction (Y-direction). The large end plate 12 is a semi-elliptical end plate attached to the end portion of the large cylindrical portion 11 on the Y-direction minus side. The large end plate 13 is a semi-elliptical end plate attached to the end portion of the large cylindrical portion 11 on the Y-direction plus side. The large end plate 12 is provided with two openings 15*a*. Each opening 15*a* is connected to a respective end of a heat medium inlet header 15. The heat medium inlet header 15 is connected to a heat medium inlet pipe 16. The large end plate 13 is also provided with two openings 17*a*. Each opening 17*a* is connected to a heat medium outlet header 17. The heat medium outlet header 17 is connected to a heat medium outlet pipe 18.

The spiral tube 20 is a spirally wound tube with a diameter d. The spiral tube 20 has liquid hydrogen or hydrogen gas flowing therein. The spiral tube 20 includes an inner spiral tube 21 and an outer spiral tube 25. The inner spiral tube 21 is a spirally wound tube with a diameter d so as to have a winding inner diameter E1 and a winding outer diameter E2. Here, the winding outer diameter E2 is $E1+2\times d$. The outer spiral tube 25 is also a spirally wound tube with a diameter d so as to have a winding outer diameter F2 and a winding inner diameter F1. Here, the winding inner diameter $F1=F2-2\times d$. The winding outer diameter F2 of the outer spiral tube 25 is smaller than the inner diameter D1 of the large cylindrical portion 11 of the casing 10, and the winding inner diameter E1 of the inner spiral tube 21 is larger than the outer diameter D2 of a small cylindrical portion 31 of the spacer 30, which will be described later.

The inner spiral tube 21 is nested inside the winding inner diameter F1 of the outer spiral tube 25. The Y-direction plus side end portion of the inner spiral tube 21 and the Y-direction plus side end portion of the outer spiral tube 25 are connected to each other. The Y-direction minus side end portion of the inner spiral tube 21 is connected to a liquid hydrogen inlet pipe 22. The liquid hydrogen inlet pipe 22 is attached to the large end plate 12 of the casing 10 via a cylindrical coupling 27. The Y-direction minus side end portion of the outer spiral tube 25 is connected to a hydrogen gas outlet pipe 26. The hydrogen gas outlet pipe 26 is also attached to the large end plate 12 of the casing 10 via a cylindrical coupling 28, like the liquid hydrogen inlet pipe 22. In this manner, the inner spiral tube 21 and the outer spiral tube 25 communicate with each other to form the spiral tube 20, inside which liquid hydrogen or hydrogen gas flows.

The spacer 30 is a hollow closed cross-section member that extends in the longitudinal direction of the casing 10 and includes the central small cylindrical portion 31, and small end plates 32 and 33 at respective ends. The small cylindrical portion 31 is a cylindrical long member having an outer diameter D2 and extending in the longitudinal direction (Y-direction). The small end plate 32 is a hemispherical end plate attached to the end portion of the small cylindrical portion 31 on the Y-direction minus side. The small end plate 33 is a hemispherical end plate attached to the end portion of the small cylindrical portion 31 on the Y-direction plus side. The small end plate 32 is attached to the center of the large end plate 12 of the casing 10 with a connecting member 34 provided at the center. Also, the small end plate 33 is attached to the center of the large end plate 13 of the casing 10 with a connecting member 35 provided at the center. Thus, the spacer 30 is attached inside the casing 10 so as to be coaxial with the casing 10. The part between the inner surface of the large cylindrical portion 11 of the casing 10 and the outer surface of the small cylindrical portion 31 of the spacer 30 forms an annular channel 50 having a width W. The outer diameter D2 of the small cylindrical portion 31 is smaller than the winding inner diameter E1 of the inner spiral tube 21. Thus, the spacer 30 is disposed inside the winding inner diameter E1 of the inner spiral tube 21.

Figure 2:
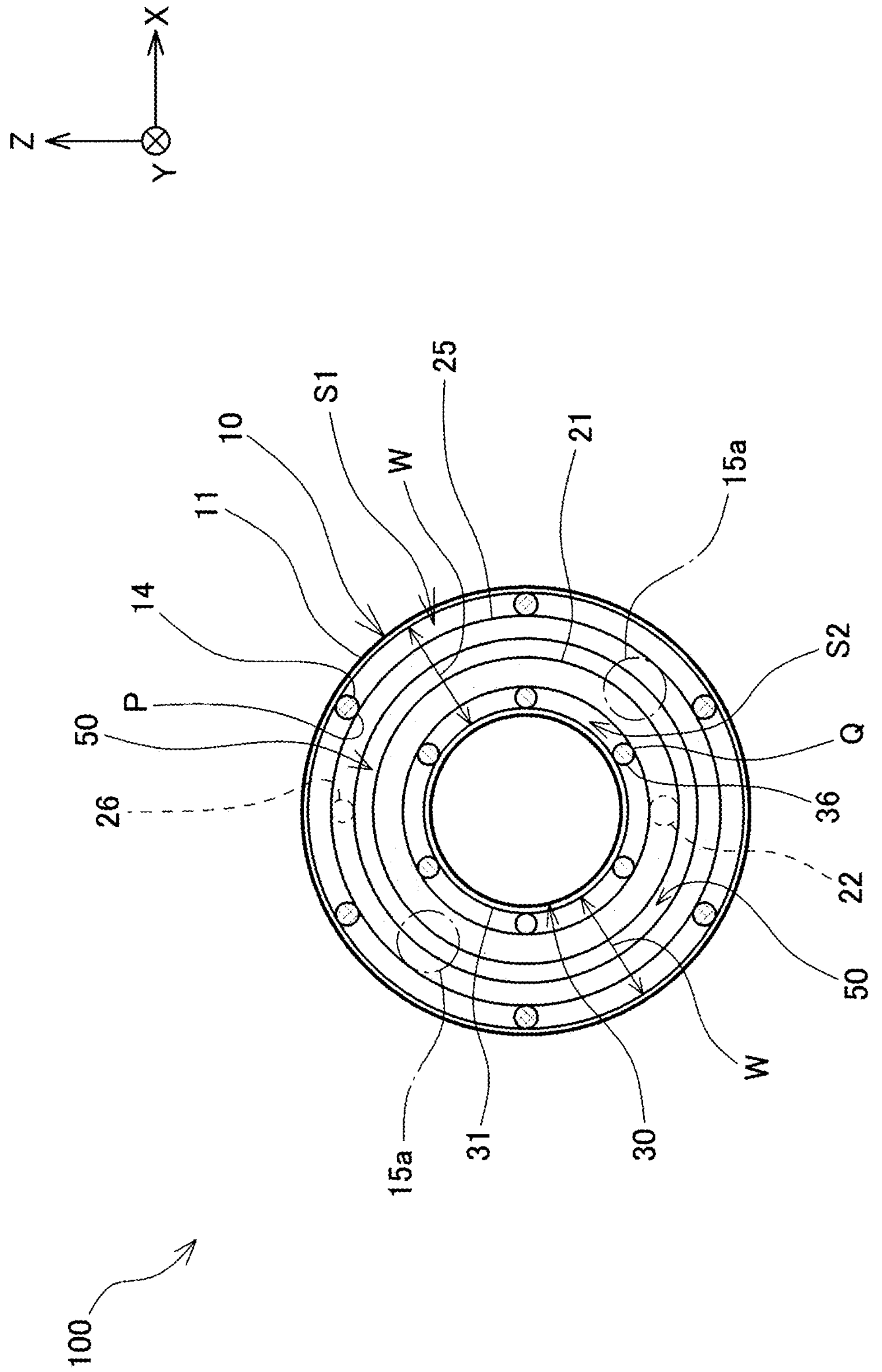
FIG. 2 is a sectional view of the vaporizer of the embodiment, showing a section taken along a line A-A shown in FIG. 1.

As shown in FIG. 2, a plurality of outer tube receivers 14 extending in the longitudinal direction (Y-direction) are attached to the inner surface of the large cylindrical portion 11 of the casing 10. A plurality of inner tube receivers 36 extending in the longitudinal direction are attached to the outer surface of the small cylindrical portion 31 of the spacer 30. Each outer tube receiver 14 is made of a round bar. Likewise, each inner tube receiver 36 is also made of a round bar.

Each outer tube receiver 14 is in point contact at points P with side surfaces on the winding outer diameter side of individual winding turns of the tube, the turns forming the outer spiral tube 25. The outer tube receiver 14 radially supports the surface on the winding outer diameter side of the outer spiral tube 25. Therefore, a gap S1 is provided between the surface on the winding outer diameter side of the outer spiral tube 25 and the inner surface of the large cylindrical portion 11. In addition, each inner tube receiver 36 is in point contact at points Q with side surfaces on the winding inner diameter side of individual winding turns of the tube, the turns forming the inner spiral tube 21. The inner tube receiver 36 radially supports the surface on the winding inner diameter side of the inner spiral tube 21. Therefore, a gap S2 is provided between the surface on the winding inner diameter side of the inner spiral tube 21 and the outer surface of the small cylindrical portion 31. In this manner, the spiral tube 20 is mounted in the annular channel 50 with gaps S1 and S2 respectively: between the outer spiral tube 25 and the inner surface of the large cylindrical portion 11; and between the inner spiral tube 21 and the outer surface of the small cylindrical portion 31.

The following describes the operation of the vaporizer 100 configured as above. In the following description, the heat medium to be used is LLC (long life coolant) or water, but it may be another liquid heat medium.

The liquid hydrogen, which has flowed into the inner spiral tube 21 from the liquid hydrogen inlet pipe 22, flows through the inner spiral tube 21 toward the Y-direction plus side. Then, the liquid hydrogen flows into the outer spiral tube 25 at the end portion on the Y-direction plus side, and flows through the outer spiral tube 25 toward the Y-direction minus side.

Meanwhile, the high-temperature LLC flows from the heat medium inlet pipe 16 through the heat medium inlet header 15 and flows into the casing 10 through the openings 15*a* provided in the casing 10. The LLC, which has flowed into the casing 10, flows toward the Y-direction plus side through the annular channel 50 having a width W, as indicated by an arrow 91 in FIG. 1.

Liquid hydrogen and LLC exchange heat through the inner spiral tube 21 and the outer spiral tube 25. The liquid hydrogen is then vaporized into hydrogen gas and flows out from the hydrogen gas outlet pipe 26. Meanwhile, the high-temperature LLC has a temperature drop due to heat exchange with liquid hydrogen, becomes a low-temperature LLC, flows from the openings 17*a* of the casing 10 through the heat medium outlet header 17, and then flows out from the heat medium outlet pipe 18.

The vaporizer 100 described above having the spacer 30 therein can cause the area of the channel, through which the heat medium flows, to be the cross-sectional area of the annular channel 50 that is smaller than the cross-sectional area of the casing 10. This makes it possible to increase the flow velocity of the heat medium inside the casing 10 and prevent the heat medium from freezing.

In addition, the vaporizer 100 has the spiral tube 20 that is mounted in the annular channel 50 with gaps S1 and S2 respectively: between the spiral tube 20 and the inner surface of the large cylindrical portion 11; and between the spiral tube 20 and the outer surface of the small cylindrical portion 31. Therefore, the LLC flows into the gaps S1 and S2, thereby improving the heat exchange efficiency and making the vaporizer 100 compact. Moreover, the smaller channel area of the annular channel 50 caused by the spiral tube 20 makes it possible to increase the flow velocity of the heat medium inside the annular channel 50, preventing the heat medium from freezing.

Furthermore, the gaps S1 and S2 prevent the large cylindrical portion 11 and the small cylindrical portion 31 from being in contact with the spiral tube 20, which has an extremely low temperature. Thereby, drastic temperature change of the casing 10 and the spacer 30 can be prevented.

Furthermore, the outer tube receiver 14 of the large cylindrical portion 11 and the inner tube receiver 36 of the small cylindrical portion 31 respectively support the outer spiral tube 25 and the inner spiral tube 21 by point contact. This reduces the contact area between: the casing 10 or the spacer 30; and the outer spiral tube 25 or the inner spiral tube 21, which spiral tubes have extremely low temperatures. This makes it possible to prevent the casing 10 or the spacer 30 from undergoing drastic temperature change.

In the above description, the spacer 30 is a hollow closed cross-section member extending in the longitudinal direction of the casing 10, but the spacer is not limited to this, so long as it restricts the flow of the heat medium inside the inner spiral tube 21. For example, the spacer may be a plate-like baffle plate provided inside the inner spiral tube 21. Alternatively, the spacer may be a spiral baffle plate, in the form of a flat plate spirally twisted, provided inside the inner spiral tube 21. This makes it possible to restrict the flow of the heat medium inside the inner spiral tube 21 and to increase the flow velocity of the heat medium in the other portions, thereby preventing the liquid heat medium from freezing.

According to research conducted by the inventors, in use of liquid LLC or water as a heat medium, when the flow velocity of the heat medium inside the casing 10 is 20 mm/s or more, the effect of preventing freezing of the heat medium begins to appear, and when the flow velocity is 26 mm/s or more, the effect of preventing freezing becomes remarkable. Therefore, when LLC or water is used as a heat medium and liquid hydrogen is vaporized by the vaporizer 100, the flow rate of a cooling water pump, through which LLC or water flows, may be increased to cause the flow velocity of LLC or water inside the casing 10 to be the above-described flow velocity.

Moreover, according to the research of the inventors, it is possible to prevent the heat medium from freezing in use of LLC or water as a heat medium, by setting the temperature difference between the temperature of the heat medium in the heat medium inlet pipe 16 and the temperature of the heat medium in the heat medium outlet pipe 18 to 10° C. or less. Therefore, when LLC or water is used as a heat medium and liquid hydrogen is vaporized by the vaporizer 100, the flow rate of the cooling water pump, through which LLC or water flows, may be increased to cause the temperature difference between the temperature of the heat medium in the heat medium inlet pipe 16 and the temperature of the heat medium in the heat medium outlet pipe 18 to be 10° C. or less.

The invention claimed is:

1. A vaporizer, through which a liquid heat medium and liquid hydrogen flow, causing the heat medium to vaporize the liquid hydrogen, the vaporizer comprising:

a spiral tube, spirally wound, in which the liquid hydrogen flows;

a casing being a hollow long member housing the spiral tube inside, the heat medium flowing on an outer surface of the spiral tube; and a spacer being a long member disposed inside a winding inner diameter of the spiral tube, wherein the spacer is a hollow closed cross-section member extending in a longitudinal direction of the casing, the spacer forming an annular channel between the spacer and an inner surface of the casing, the annular channel extending in the longitudinal direction of the casing, the annular channel being a channel through which the heat medium flows in the longitudinal direction, the spiral tube is disposed in the annular channel so as to have a gap between the spiral tube and the inner surface of the casing, and a gap between the spiral tube and an outer surface of the spacer, the casing includes a large cylindrical portion and large end plates attached to respective ends of the large cylindrical portion, and further includes a rod-shaped outer tube receiver attached to an inner surface of the large cylindrical portion, the rod-shaped outer tube receiver extending in the longitudinal direction, the spacer includes a small cylindrical portion and small end plates attached to respective ends of the small cylindrical portion, and further includes an inner tube receiver attached to an outer surface of the small cylindrical portion, the inner tube receiver extending in the longitudinal direction, the inner surface of the large cylindrical portion and the outer surface of the small cylindrical portion form the annular channel, and the spiral tube is mounted in the annular channel so as to cause the outer tube receiver to form a gap between a spiral tube surface on a winding outer diameter side and the inner surface of the large cylindrical portion and so as to cause the inner tube receiver to form a gap between a spiral tube surface on a winding inner diameter side and the outer surface of the small cylindrical portion.

2. The vaporizer according to claim 1, wherein the heat medium is LLC or water.

* * * * *